United States Patent
Jo et al.

(10) Patent No.: US 9,578,478 B1
(45) Date of Patent: Feb. 21, 2017

(54) SYSTEM FOR TRANSMITTING TEXT MESSAGE AUTOMATICALLY WHILE DRIVING AND METHOD FOR THE SAME

(71) Applicant: KIA MOTORS CORPORATION, Seoul (KR)

(72) Inventors: Young Woon Jo, Paju-si (KR); Seung Chang Park, Seoul (KR)

(73) Assignee: KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/940,001

(22) Filed: Nov. 12, 2015

(30) Foreign Application Priority Data

Aug. 24, 2015 (KR) .................. 10-2015-0119096

(51) Int. Cl.
| | | |
|---|---|---|
| H04W 4/00 | (2009.01) | |
| H04W 4/14 | (2009.01) | |
| H04W 4/02 | (2009.01) | |
| H04M 1/725 | (2006.01) | |
| H04M 1/60 | (2006.01) | |

(52) U.S. Cl.
CPC ............ *H04W 4/14* (2013.01); *H04M 1/6075* (2013.01); *H04M 1/72577* (2013.01); *H04W 4/008* (2013.01); *H04W 4/02* (2013.01)

(58) Field of Classification Search
CPC ....................................................... H04W 4/14
See application file for complete search history.

(56) References Cited

U.S. PATENT DOCUMENTS

| | | | |
|---|---|---|---|
| 7,898,428 B2 | 3/2011 | Dietz et al. | |
| 2010/0201478 A1* | 8/2010 | Veen | G06F 21/36 340/3.1 |
| 2011/0151838 A1* | 6/2011 | Olincy | H04M 1/64 455/412.1 |
| 2011/0151852 A1* | 6/2011 | Olincy | H04M 1/72552 455/418 |
| 2012/0100876 A1* | 4/2012 | Anderson | H04M 1/6091 455/466 |
| 2015/0050966 A1* | 2/2015 | West | H04M 1/72577 455/569.2 |
| 2015/0350400 A1* | 12/2015 | Polak | H04W 4/12 455/412.2 |
| 2016/0068123 A1* | 3/2016 | Helmhold | B60H 1/00 701/2 |

FOREIGN PATENT DOCUMENTS

| | | |
|---|---|---|
| JP | 2013-257227 A | 12/2013 |
| KR | 10-2005-0117899 A | 12/2005 |
| KR | 10-2013-0008036 A | 1/2013 |
| KR | 10-2013-0120570 A | 11/2013 |

* cited by examiner

*Primary Examiner* — Mazda Sabouri

(74) *Attorney, Agent, or Firm* — McDermott Will & Emery LLP

(57) ABSTRACT

A method for transmitting a text message includes receiving, by a mobile communicator, the text message from an external terminal. Whether a vehicle is being driven is determined by a controller based on vehicle information including vehicle speed information. Whether a user of the external terminal is included in a first reply group is determined by the controller when the vehicle is being driven. Whether the user of the external terminal is included in a second reply group is determined by the controller when the user of the external terminal is included in the first reply group. A fixed response message is transmitted to the external terminal by the controller when the user of the external terminal is not included in the second reply group.

8 Claims, 3 Drawing Sheets

FIG. 2

| User ID | First reply group | Second reply group |
|---|---|---|
| User 1 | ● | ● |
| User 2 | ● | ● |
| User 3 | ● | × |
| User 4 | ● | × |
| User 5 | × | × |
| ⋮ | ⋮ | ⋮ |
| User n | × | × |

SYSTEM FOR TRANSMITTING TEXT MESSAGE AUTOMATICALLY WHILE DRIVING AND METHOD FOR THE SAME

CROSS-REFERENCE TO RELATED APPLICATION

This application claims the benefit of priority to Korean Patent Application No. 10-2015-0119096 filed in the Korean Intellectual Property Office on Aug. 24, 2015, the entire content of which is incorporated herein by reference.

TECHNICAL FIELD

The present disclosure relates to a system for transmitting a message and a method for the same.

BACKGROUND

A car accident rate due to driver's mobile phone use while driving a vehicle has been increased. Therefore, the usage of a mobile phone while driving is restricted by law and it is recommended to use a hands-free device.

However, the hands-free device supports only a voice call function such that text messaging cannot be performed via the hands-free device.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a system for transmitting a message, capable of transmitting an appropriate response message to an external terminal when a text message is received from the external terminal while driving a vehicle, and a method for the same.

According to an exemplary embodiment of the present inventive concept, a method for transmitting a message includes receiving the text message by mobile communicator from an external terminal. Whether a vehicle is being driven is determined by a controller based on vehicle information including vehicle speed information. Whether a user of the external terminal is included in a first reply group is determined by the controller when the vehicle is being driven. Whether the user of the external terminal is included in a second reply group is determined by the controller when the user of the external terminal is included in the first reply group. A fixed response message is transmitted to the external terminal by the controller when the user of the external terminal is not included in the second reply group.

The vehicle information may further include location information of the vehicle, destination information, and expected time of arrival information.

The method may further include determining whether response request information is extracted from the text message when the user of the external terminal is included in the second reply group. A customized response message is generated based on the response request information and the vehicle information and transmitted to the external terminal when the response request information is extracted.

The method may further include transmitting the fixed response message to the external terminal when the response request information is not extracted.

The response request information may include at least one of information for requesting a current location of a driver, information for requesting a destination, information for requesting an expected time of arrival, and information for requesting an immediate reply.

According to another exemplary embodiment of the present inventive concept, a system for transmitting a message includes a mobile communicator configured to receive the text message from an external terminal. A short range communicator is configured to receive vehicle information including vehicle speed information from a vehicle mounted device. A memory is configured to store a contact list in which a first reply group and a second reply group are set. A controller is configured to determine whether a vehicle is being driven based on the vehicle information. When the vehicle is being driven, the controller determines whether a user of the external terminal is included in the first reply group. When the user of the external terminal is included in the first reply group, the controller determines whether the user of the external terminal is included in the second reply group. When the user of the external terminal is not included in the second reply group, the controller transmits a fixed response message to the external terminal.

The vehicle information may further include location information of the vehicle, destination information, and expected time of arrival information.

When the user of the external terminal is included in the second reply group, the controller may determine whether response request information is extracted from the text message. When the response request information is extracted, the controller may generate a customized response message based on the response request information and the vehicle information and transmit the customized response message to the external terminal.

When the response request information is not extracted, the controller may transmit the fixed response message to the external terminal.

The response request information may include at least one of information for requesting a current location of a driver, information for requesting a destination, information for requesting an expected time of arrival, and information for requesting an immediate reply.

According to the exemplary embodiment of the present inventive concept described above, when a text message is received from an external terminal while driving a vehicle, an appropriate response message is automatically transmitted to the external terminal. Therefore, convenience and driving safety may be provided to a driver while driving.

BRIEF DESCRIPTION OF THE DRAWINGS

FIG. 2 is a view exemplarily illustrating a contact list according to an exemplary embodiment of the present inventive concept.

DETAILED DESCRIPTION OF THE EMBODIMENTS

Figure 1:
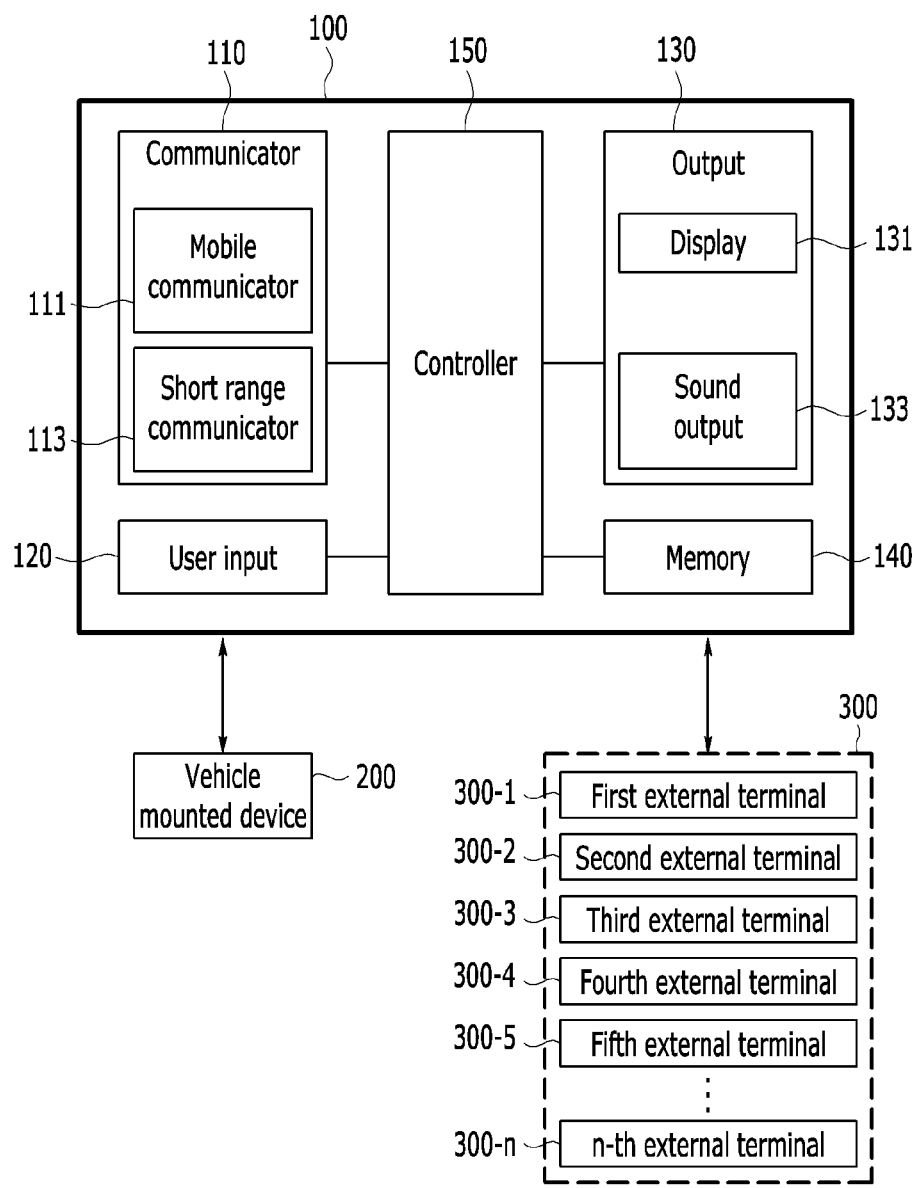
FIG. 1 is a block diagram of a system for transmitting a message according to an exemplary embodiment of the present inventive concept.

Hereinafter, the present disclosure will be described more fully with reference to the accompanying drawings, in which exemplary embodiments of the invention are shown.

The components illustrated in the drawings are optionally determined for better understanding and ease of description, and the present invention is not limited to the examples illustrated in the drawings.

FIG. 1 is a block diagram of a system for transmitting a message according to an exemplary embodiment of the present inventive concept, and FIG. 2 is a view exemplarily illustrating a contact list according to an exemplary embodiment of the present inventive concept.

As illustrated in FIG. 1, a system for transmitting a message 100 according to an exemplary embodiment of the present inventive concept may include a communicator 110, a user input 120, an output 130, a memory 140, and a controller 150. The system 100 may be a wireless communication device such as a smart phone, a tablet PC, or a personal digital assistant (PDA).

The communicator 110 may include a mobile communicator 111 and a short range communicator 113.

The mobile communicator 111 may transmit/receive a wireless signal to/from at least one of a base station, an external terminal 300, and a server on a mobile communication network. That is, the system 100 transmits/receives the message to/from the external terminal 300 through the mobile communication network. The text message which is received from the external terminal 300 may include a short message service (SMS) message, a multimedia message service (MMS) message, or an instant message.

The short range communicator 113 performs short range communication with a vehicle mounted device 200. As a short range communication technology, Bluetooth, radio frequency identification (RFID), infrared data association (IrDa), and ultra wideband (UWB) may be used. That is, the system 100 may receive vehicle information from the vehicle mounted device 200.

The user input 120 generates input data to allow a user/driver to control an operation of the system 100. The user input 120 may comprise a touch pad and a key pad. Particularly, when the touch pad forms a layer structure with a display 131 which will be described below, the touch pad may be called a touch screen.

The output 130 generates an output related with a sense of vision or a sense of hearing, and may include the display 131 and a sound output 133.

The display 131 may display information which is processed in the system 100. When the system 100 receives a text message, the display 131 may display the text message.

The sound output 133 may output audio data which is stored in the memory 140. The sound output 133 may output a sound signal related with a function which is performed in the system 100 (for example, a function of notifying that a text message has been received).

The memory 140 may store a program for an operation of the controller 150 and temporarily store input/output data. Further, a contact list is also stored in the memory 140. The contact list may include identifications (ID) and phone numbers of users of external terminals 300-1 to 300-n.

The controller 150 may be implemented by at least one microprocessor which operates by a predetermined program, and the predetermined program may include a series of commands for performing individual steps included in a message transmitting method according to the present disclosure.

The system 100 may receive vehicle information from the vehicle mounted device 200 through the short range communicator 113. The vehicle mounted device 200 may collect the vehicle information through communication in the vehicle (for example, controller area network (CAN) communication). The vehicle information may include vehicle speed information, location information of a vehicle, destination information, and expected time of arrival information.

As illustrated in FIG. 2, a user or driver may set a first reply group from the contact list through the user input 120. The first reply group may include users of external terminals 300-1 to 300-4 that the driver desires to notify that the driver is currently driving. For example, when a text message is received from the external terminal 300-1 while driving a vehicle, the system 100 may transmit a fixed response message to the external terminal 300-1. The fixed response message may include predetermined contents (for example, contents to notify that the driver is driving) regardless of the contents of the text message.

Further, the driver may set a second reply group among the first reply group through the user input 120. The second reply group may include users of external terminals 300-1 and 300-2 that the driver desires to specifically provide a status of the driver. For example, when the text message is received from the external terminal 300-1 while driving a vehicle and the text message includes response request information, the system 100 may transmit a customized response message to the external terminal 300-1. The customized response message is a message which varies depending on a status of the driver, and may be generated based on the response request information.

Hereinafter, a method for transmitting a message according to an exemplary embodiment of the present inventive concept will be described in detail with reference to FIG. 3.

Figure 3:
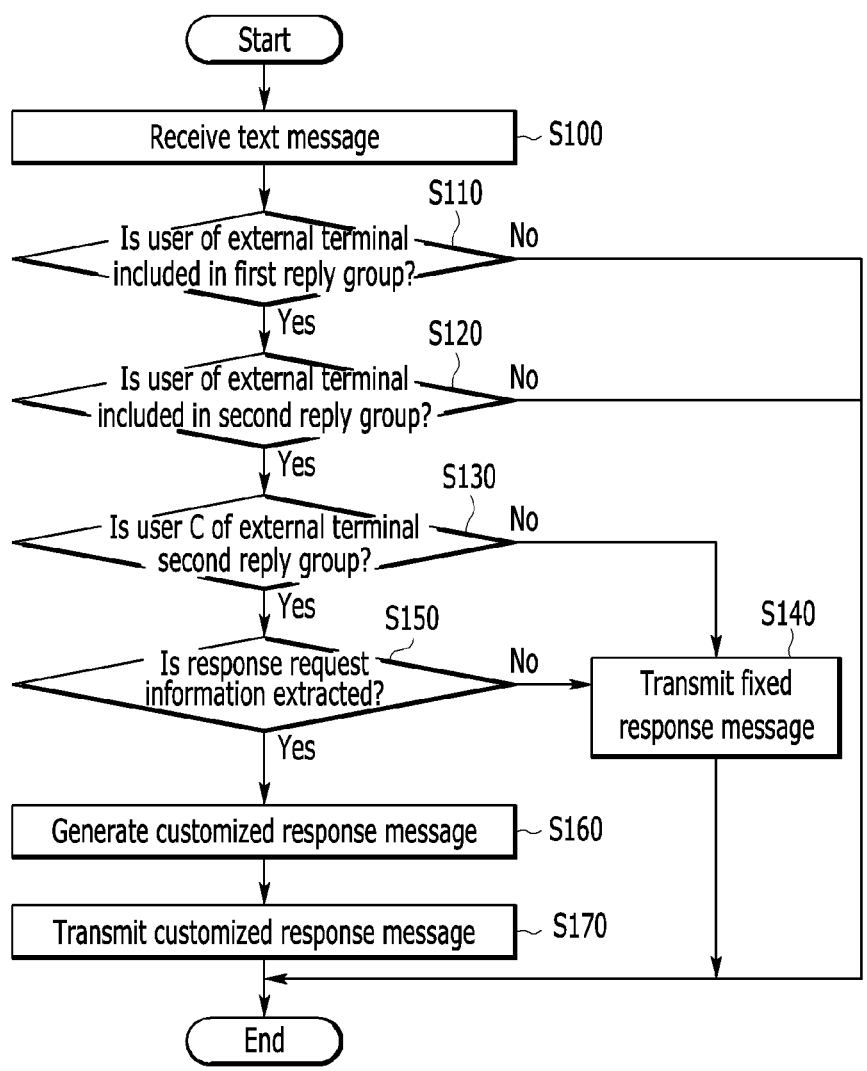
FIG. 3 is a flowchart of a method for transmitting a message according to an exemplary embodiment of the present inventive concept.

FIG. 3 is a flowchart of a method for transmitting a message according to an exemplary embodiment of the present inventive concept.

The method according to the present disclosure starts when the system 100 receives a text message from any one of the external terminals 300 in step S100. Hereinafter, an example in which the text message is received from the external terminal 300-1 will be described.

The system 100 may determine whether the vehicle is being driven based on vehicle information in step S110. The system 100 may receive vehicle information from the vehicle mounted device 200, and the vehicle information may include vehicle speed information, location information of the vehicle, destination information, and expected time of arrival information.

In step S110, when the vehicle is not being driven, the method according to the present disclosure terminates. That is, the system 100 does not automatically transmit a response message to the external terminal 300-1 without having input data of the user input 120.

When the vehicle is being driven in step S110, the system 100 may determine whether a user of the external terminal 300-1 is included in the first reply group in step S120.

In step S120, when the user of the external terminal 300-1 is not included in the first reply group, the method according to the present disclosure terminates. That is, the system 100 does not automatically transmit the response message to the external terminal 300-1 without having the input data of the user input 120.

In step S120, when the user of the external terminal 300-1 is included in the first reply group, the system 100 may determine whether the user of the external terminal 300-1 is included in the second reply group in step S130.

In step S130, when the user of the external terminal 300-1 is not included in the second reply group, the system 100 may transmit a fixed response message to the external terminal 300-1 in step S140. The fixed response message may include a message informing that the vehicle is driving.

In step S130, when the user of the external terminal 300-1 is included in the second reply group, the system 100 may determine whether response request information is extracted from the text message in step S150. The response request information may be extracted by a text mining technique. The text mining technique is well known to a person of ordinary skill in the art so a detailed description thereof will be omitted.

The response request information may include at least one of information for requesting a current location of the driver, information for requesting a destination, information for requesting an expected time of arrival, and information for requesting an immediate reply.

For example, when the text message includes a message saying "Where are you now?", the message transmitting device 100 extracts "where" and "are (you) now" as response request information to determine that the user of the external terminal 300-1 requests the current position information of the driver. When the text message includes "When will you come?," the system 100 extracts "when" and "come" as the response request information to determine that the user of the external terminal 300-1 requests the expected time of arrival. When the text message includes "[Urgent] check e-mail please," the system 100 extracts "[Urgent]" and "e-mail" as the response request information to determine that the user of the external terminal 300-1 requests an immediate reply.

In step S150, when no response request information is extracted from the text message, the system 100 may transmit the fixed response message to the external terminal 300-1.

When the response request information is extracted from the text message in step S150, the system 100 may generate a customized response message based on the response request information and the vehicle information in step S160.

For example, when the response request information including information for requesting a current location of the driver, information for requesting a destination, and information for requesting an expected time of arrival is extracted from the text message, the system 100 may generate a customized response message based on vehicle information including the location information of the vehicle, the destination information, and the expected time of arrival information. The customized response message may include a message saying that "I'm passing XX station now. There are ZZ minutes to go to YY station." When the response request information including information for requesting an immediate reply of the driver is extracted from the text message, the system 100 may generate a customized response message based on the vehicle information. In this case, the customized response message may include "I'm driving at a high speed. Please call me if needed."

The system 100 may transmit the customized response message to the external terminal 300-1 in step S170.

As described above, according to the exemplary embodiment of the present inventive concept, when a text message is received from an external terminal while driving a vehicle, an appropriate response message may be transmitted to the external terminal. Therefore, convenience and driving stability may be provided to a driver while driving.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. A method for transmitting a text message comprising:
receiving, by a mobile communicator, the text message from an external terminal;
determining, by a controller, whether a vehicle is being driven based on vehicle information including vehicle status information;
determining, by the controller, whether a user of the external terminal is included in a first reply group when the vehicle is being driven;
determining, by the controller, whether the user of the external terminal is included in a second reply group when the user of the external terminal is included in the first reply group;
transmitting, by the controller, a fixed response message to the external terminal when the user of the external terminal is not included in the second reply group;
determining whether response request information is extracted from the text message when the user of the external terminal is included in the second reply group;
generating a customized response message based on the response request information and the vehicle information when the response request information is extracted; and
transmitting the customized response message to the external terminal.

2. The method of claim 1, wherein the vehicle information further includes location information of the vehicle, destination information, and expected time of arrival information.

3. The method of claim 1, further comprising transmitting the fixed response message to the external terminal when the response request information is not extracted.

4. The method of claim 1, wherein the response request information includes at least one of information for requesting a current location of a driver, information for requesting a destination, information for requesting an expected time of arrival, and information for requesting an immediate reply.

5. A system for transmitting a text message, comprising:
a mobile communicator configured to receive the text message from an external terminal;
a short range communicator configured to receive vehicle information including vehicle status information from a vehicle mounted device;
a memory configured to store a contact list in which a first reply group and a second reply group are set; and
a controller configured to determine whether a vehicle is being driven based on the vehicle information,
wherein when the vehicle is being driven, the controller determines whether a user of the external terminal is included in the first reply group,
wherein when the user of the external terminal is included in the first reply group, the controller determines whether the user of the external terminal is included in the second reply group,
wherein when the user of the external terminal is not included in the second reply group, the controller transmits a fixed response message to the external terminal,
wherein when the user of the external terminal is included in the second reply group, the controller determines whether response request information is extracted from the text message, and wherein when the response request information is extracted, the controller generates a customized response message based on the response request information and the vehicle information and transmits the customized response message to the external terminal.

6. The system of claim 5, wherein the vehicle information further includes location information of the vehicle, destination information, and expected time of arrival information.

7. The system of claim 5, wherein when the response request information is not extracted, the controller transmits the fixed response message to the external terminal.

8. The system of claim 5, wherein the response request information includes at least one of information for requesting a current location of a driver, information for requesting a destination, information for requesting an expected time of arrival, and information for requesting an immediate reply.

* * * * *